(12) United States Patent
Martin

(10) Patent No.: US 6,217,699 B1
(45) Date of Patent: Apr. 17, 2001

(54) METHOD AND MACHINE FOR WELDING THERMOFORMED SHEETS OF PLASTICS MATERIAL

(75) Inventor: Claude Martin, La Ville Aux Clercs (FR)

(73) Assignee: Harmon Thermal Europe (France), Paris (FR)

( * ) Notice: Subject to any disclaimer, the term of this patent is extended or adjusted under 35 U.S.C. 154(b) by 0 days.

(21) Appl. No.: 09/072,582

(22) Filed: May 5, 1998

(30) Foreign Application Priority Data

May 7, 1997 (FR) .................................................. 97 05667

(51) Int. Cl.⁷ ...................................................... B32B 31/20
(52) U.S. Cl. ......................... 156/292; 156/311; 156/498; 156/499
(58) Field of Search .................................... 156/433, 675, 156/197, 205, 228, 282, 290, 292, 311, 498, 499; 264/286, 287; 425/509; 432/81; 228/46, 181

(56) References Cited

U.S. PATENT DOCUMENTS

| | | | |
|---|---|---|---|
| 2,423,237 | * | 7/1947 | Haslacher ............................... 154/42 |
| 3,356,555 | * | 12/1967 | Jackson ................................. 156/205 |
| 3,673,057 | * | 6/1972 | Fairbanks ............................... 161/68 |
| 4,174,987 | * | 11/1979 | Belvin et al. ......................... 156/197 |
| 4,473,432 | | 9/1984 | Leader et al. . |
| 4,678,115 | * | 7/1987 | Weisert ................................. 228/183 |
| 5,217,556 | * | 6/1993 | Fell ....................................... 156/205 |
| 5,421,935 | * | 6/1995 | Dixon et al. .......................... 156/197 |
| 5,554,252 | * | 9/1996 | Foran ................................... 156/497 |

FOREIGN PATENT DOCUMENTS

| | | |
|---|---|---|
| 1250627 | 9/1967 | (DE) . |
| 1978803 | 2/1968 | (DE) . |
| 1479840 | 4/1969 | (DE) . |
| 195 22 402 | 1/1997 | (DE) . |
| 0095004 | 11/1983 | (EP) . |
| 0327256 | 8/1989 | (EP) . |
| 0611643 | 8/1994 | (EP) . |
| 0723853 | 7/1996 | (EP) . |
| 2026836 | 10/1969 | (FR) . |
| 4223136 | 8/1992 | (JP) . |

* cited by examiner

*Primary Examiner*—Michael W. Ball
*Assistant Examiner*—Gladys Piazza
(74) *Attorney, Agent, or Firm*—Dowell & Dowell, P.C.

(57) ABSTRACT

A method and apparatus for welding thermoformed sheets of plastic material having lands formed therein such that the lands are welded to one another utilizing tubes which are positioned to be in line with the lands in a stack of thermoformed sheets so as to direct hot and cold gas to the lands to complete the welding process. In some embodiments, a plurality of tubes are inserted from opposite sides of blocks of stacked thermoformed sheets such that the tubes enter cells defined between the sheets of the block.

7 Claims, 3 Drawing Sheets

METHOD AND MACHINE FOR WELDING THERMOFORMED SHEETS OF PLASTICS MATERIAL

BACKGROUND OF THE INVENTION

1. Field of the Invention

The present invention consists in a method and a machine for welding thermoformed sheets of plastics material.

2. Description of the Related Art

Welding thermoformed plastics material sheets together to obtain cellular blocks for many applications is known in itself. For example, profiled thermoformed PVC (Polyvinyl Chloride) sheets have until now been assembled by ultrasonic welding, by high-frequency welding or by gluing.

An assembly method of the above kind is reliable for PVC but when this material burns it releases chlorine which combines with hydrogen and oxygen in the air to form the toxic gas hypochlorite.

It has therefore been proposed to replace the PVC with other, less harmful materials, ones not containing chlorine, and the combustion of which produces only water. Polypropylene and polyethylene are advantageously used, for example. Unfortunately, ultrasonic welding of thermoformed sheets of either of these materials is in practice difficult, time-consuming and costly. Moreover, high-frequency welding is impossible with these materials. Gluing is possible, on the other hand, using a glue suitable for polypropylene, for example Araldite®, as an adhesive. However, this particular adhesive ages badly, absorbs water and in the final analysis is not compatible with the more frequent applications of the thermoformed sheets, in particular when they are used to make cellular blocks for embankments, underground storage tanks, etc.

The conventional welding methods are summarized below:

Clamp welding: This method consists in clamping the two elements to be welded between two fingers heated to a sufficient temperature to melt the plastics material. The heating is effected by contact which means that the molten material can adhere to the finger when it is withdrawn, which is a significant drawback of this method. Also, it is not possible to weld more than two elements at a time, unless the lower finger is dispensed with.

Mirror welding: This method is widely used in the field of plastics material, in particular for butt jointing tubes. The two tubes to be welded are placed end-to-end on a support with a gap of a few millimeters between their ends. This method has the advantage of simplicity, but it is more particularly suited to elements of large section. When it is withdrawn, the mirror removes a small amount of molten material from the elements to be welded. In the case of butt welding plastic tube this is of no consequence, but for a sheet a few hundreds of microns thick the damage caused can be significant.

Ultrasound welding: This method has the advantage of enabling welding in places where access is difficult for other, more conventional methods. However, it requires an ultrasound generator, which is often costly, and it is often impossible to weld more than two elements at the same time because to avoid dissipating the vibrating energy there cannot be a plurality of stacked welding levels between the anvil and the "sonotrode" (the device generating the ultrasounds). Also, the minimum pressure to be applied by the sonotrode is relatively high, which means that this method finds more particular application to rigid structures or plane elements. Finally, the efficiency of transmission of vibratory energy between the sonotrode and the contact surface of the elements to be welded is in inverse proportion to their modulus of elasticity.

Infra-red welding: The heat source is a battery of infra-red lamps which heat one or both of the elements to be welded, causing them to melt at certain points. It is then sufficient to apply a force between the two elements in the molten areas to weld them. This method has definite advantages, but also entails the difficulty of channeling the thermal radiation towards the welding surfaces. The area adjoining the contact surface can absorb some of the incident radiation and this increase in temperature can soften it, even partially melt it, and deform it. It would then be impossible to apply a force to the elements without damaging them, which would be particularly harmful in the case of thin thermoformed sheets.

SUMMARY OF THE INVENTION

Accordingly, the aim of the invention is to propose a welding method that remedies the drawbacks of the prior art methods.

In accordance with the invention, the method of welding thermoformed sheets of plastics material is characterized in that hot air at a particular temperature is blown onto lands for welding the sheets two by two while applying transverse pressure to the sheets to press them together.

The heat source is a high temperature air jet which heats one or both of the contact lands to be welded, causing them to melt at certain points. It is then sufficient to apply a force between the two elements in the molten areas to weld them.

In one embodiment of the invention hot air blower nozzles are disposed in a machine for vacuum thermoforming sheets of plastics material in line with lands for welding two superposed sheets and the sheets are first thermoformed and then welded by blowing hot air either on one side only of the two sheets to be welded or on both sides simultaneously.

In a second embodiment of the method of the invention a series of thermoformed sheets are stacked to constitute a cellular block delimiting a set of horizontal cells separated by contact lands between the sheets after which batteries of tubes equipped with hot air blower nozzles are introduced laterally into these cells from each side of the block, in order to weld the lands together.

In one embodiment of the method, after blowing hot air, cold air is blown onto the welding lands, either onto one side only of the two sheets to be welded or onto both sides simultaneously.

The machine for implementing the above method comprises, in accordance with the invention, two dies for thermoforming plastics material sheets, said dies being stacked symmetrically on either side of a horizontal plane and connected to vacuum means for the purpose of thermoforming sheets disposed between the dies and includes tubes for blowing hot air and then, if necessary, cold air onto contact lands between two thermoformed sheets in order to weld the latter together at their contact lands.

In another embodiment of the invention the machine for implementing the above method is adapted to weld a block of sheets stacked via their mutual contact lands, the sheet delimiting between them horizontal cells communicating with vertical cells.

In accordance with the invention, the machine comprises at least one battery of tubes mobile horizontally and adapted to be introduced laterally into said horizontal cells and each provided with nozzles for blowing hot air and then, if necessary, cold air onto the contact lands between the sheets of the block, and means for applying to the top sheet of the block a pressure transmitted to all the contact lands of the block.

In this way all the sheets of the block can very quickly be welded together in a single operation.

Also, because it is very simple to channel the hot air, this method enables welding to be carried out in places where access is difficult.

BRIEF DESCRIPTION OF THE DRAWINGS

Other features and advantages of the invention will become apparent in the following description given with reference to the accompanying drawings which show various embodiment of the invention by way of non-limiting example.

DESCRIPTION OF THE PREFERRED EMBODIMENTS

Figure 1:
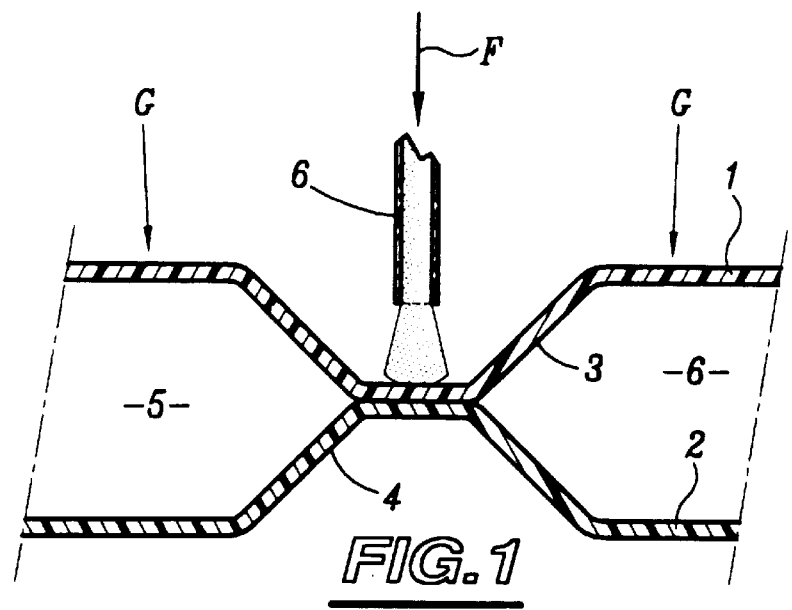
FIG. 1 is a partial sectional view of two stacked thermoformed plastics material sheets to be welded together using a first embodiment of the method of the invention.

FIG. 1 shows two stacked sheets 1, 2 of thermoformed plastics material having regularly spaced bosses 3, 4 forming mutual contact lands delimiting between them horizontal cells 5, 6. The sheets 1, 2 can be sheets of polypropylene or polyethylene, for example.

The contacting surfaces of the lands 3, 4 of the two sheets 1, 2 can be welded together by blowing hot air at a particular temperature onto the welding lands 3, 4 by means of nozzles 6 perpendicular to the horizontal contacting surfaces of the lands 3, 4.

The flow of hot air impinges orthogonally (arrow F) on the surfaces to be welded, either on one side only of the lands 3, 4 as shown in FIG. 1, or on both sides simultaneously, a set of nozzles similar to the nozzles 6 being then disposed under the nozzles 6 and impinging on the lands 4 of the bottom sheets 2. Appropriate means, such as a set of cylinders, not shown, apply transverse pressure G to the sheets 1, 2 in order to press them together. After blowing hot air, the nozzles 6 blow cold air onto the lands 3, 4.

Thus it is the face of each sheet 1, 2 opposite the contacting surface that is heated.

To give a non-limiting numerical example for polypropylene sheets, the temperature of the hot air can be 120° C., the time for which the hot air is blown can be a few tens of seconds, the temperature of the cold air can be room temperature and the time for which the cold air is blown can be a few tens of seconds.

Figure 2:
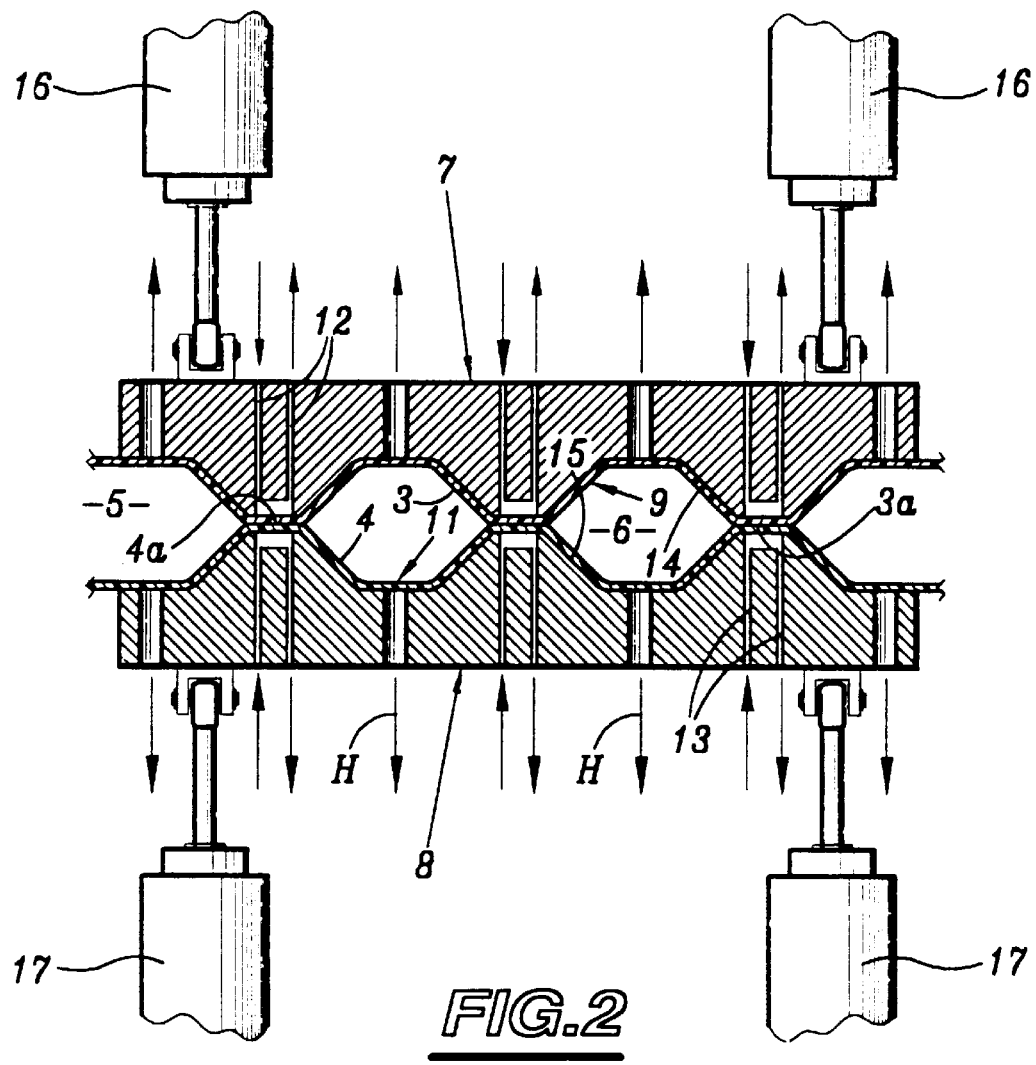
FIG. 2 is a diagrammatic view in elevation of a first embodiment of the welding machine of the invention.

The machine for welding thermoformed sheets shown diagrammatically in FIG. 2 comprises two horizontally stacked dies 7, 8 for vacuum thermoforming (arrows H) plastics material sheets 9, 11 in a manner known in itself. The sheets have lands 3, 4 delimiting surfaces 3a, 4a to be welded.

The machine is equipped with a set of tubes 12 and 13 orthogonal to the respective contacting surfaces 3a, 4a inside profiled bosses 14 and 15 of the dies 7, 8 conjugate to the welding lands 3, 4. The ends of the tubes 12, 13 open onto the tops of the bosses 14, 15, at a slight distance from the latter, to enable evacuation of the hot air and then the cold air blown onto the mutual contact surfaces 3a, 4a. Finally, the machine is equipped with means for applying transverse pressure to the dies 7, 8 to press the sheets 9, 11 together, for example a set of conveniently disposed hydraulic cylinders 16, 17.

The sheets 9, 11 are first thermoformed so that they espouse the profile of the symmetrical dies 7, 8 by application of vacuum (arrows H), the lands 3, 4 so formed delimiting the horizontal cells 5, 6 between them. Hot air at an appropriate temperature is then blown into the tubes 12, 13 for an appropriate time and finally, after the areas in contact of the lands 3, 4 melt, cold air at an appropriate temperature is blown for an appropriate time.

The hot air can be blown either onto one side only (in which case one of the two sets of tubes is not used) or onto both sides simultaneously.

Figure 3:
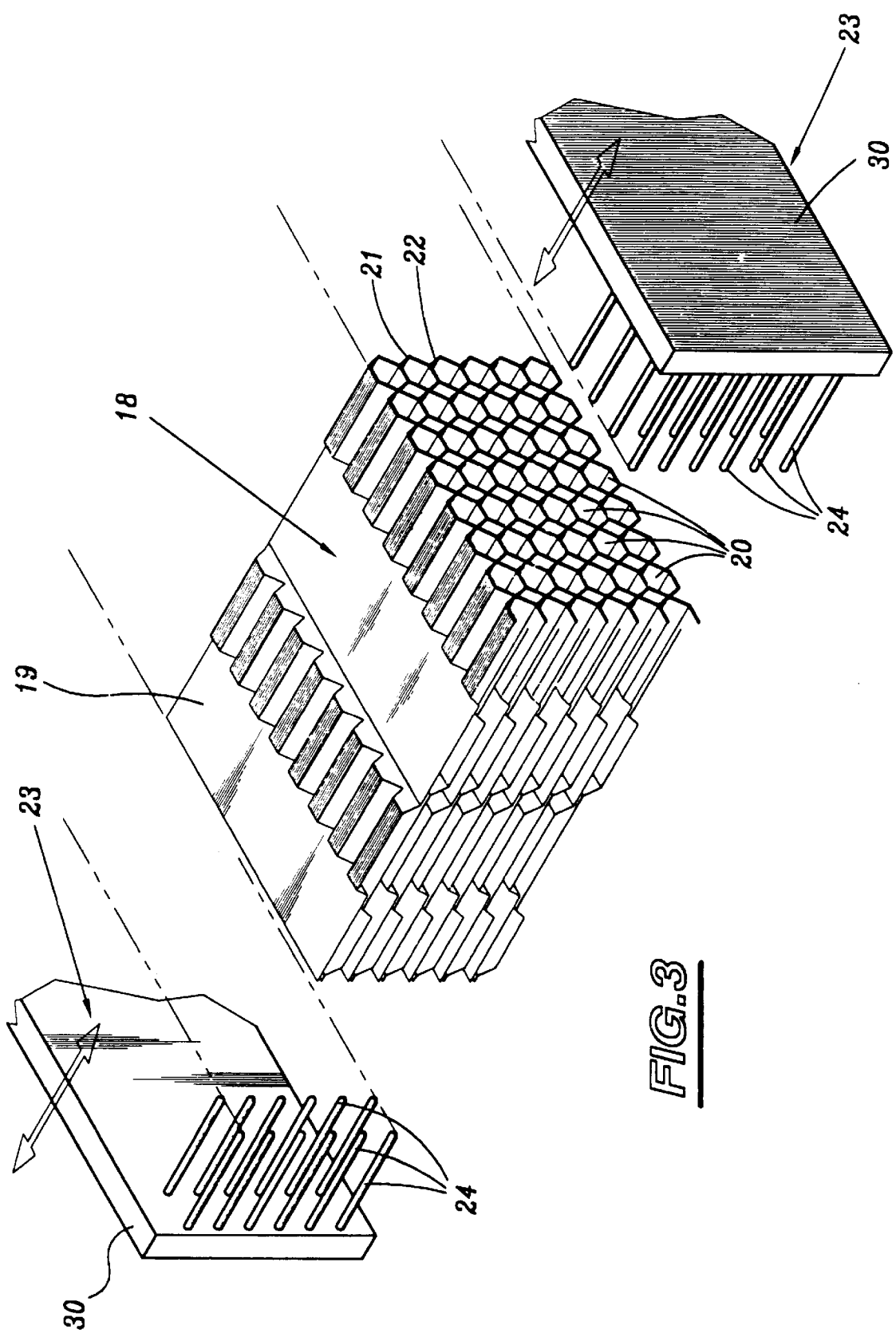
FIG. 3 is a partial schematic perspective view of a second embodiment of the welding machine of the invention and of a cellular block of thermoformed sheets to be welded together.
Figure 4:
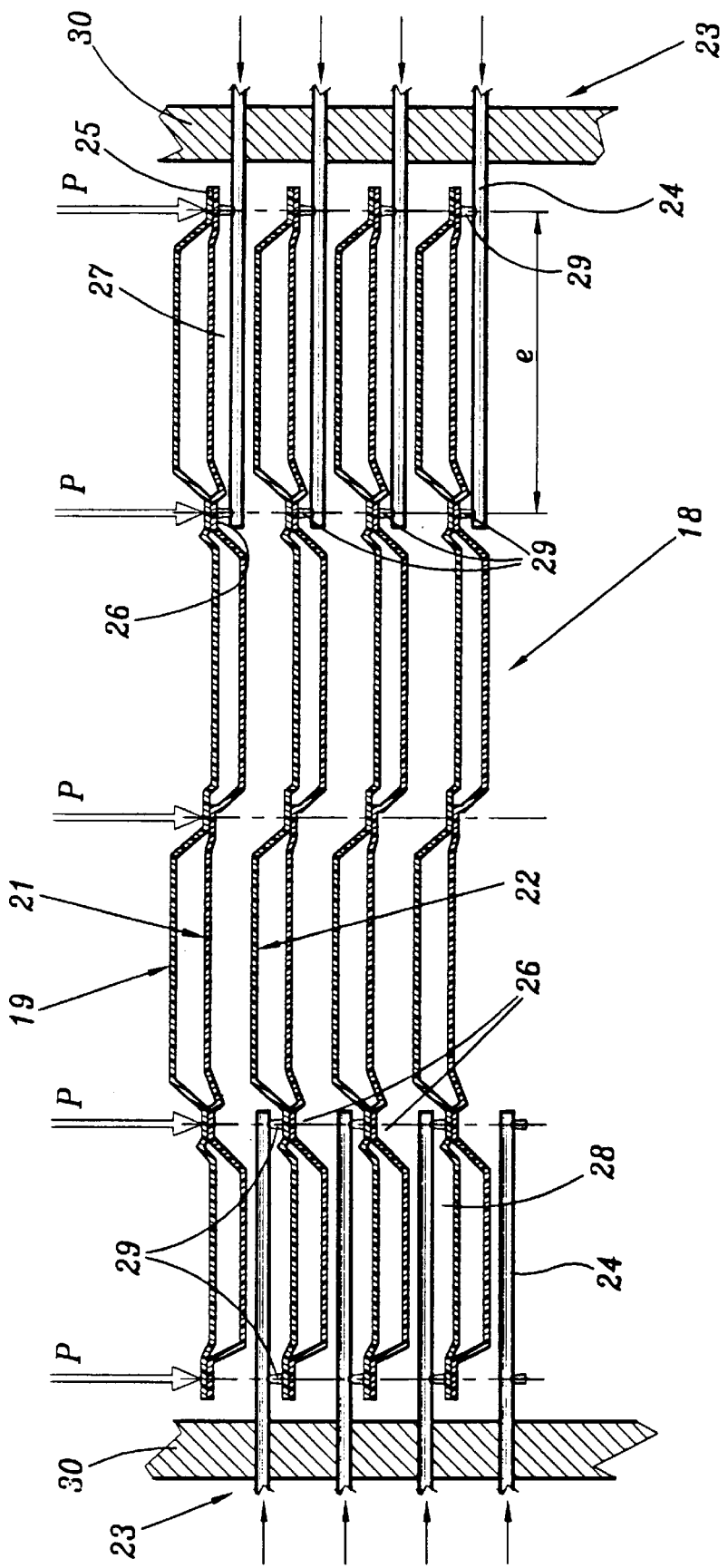
FIG. 4 is a view in partial section and in lateral elevation of a cellular block of sheets to be welded together and of associated batteries of tubes blowing air of the embodiment from FIG. 3.

FIG. 3 shows a cellular block 18 made up of a stack of plastics material sheets 19, 21, 22, etc thermoformed and profiled so as to delimit between them a set of horizontal cells 20 (FIG. 4). The sheets 19, 21, 22, etc have an alternating configuration delimiting a set of contact lands 25, 26 and horizontal cells 27, 28 between two consecutive pairs of sheets in contact at the lands 25, 26.

The machine for welding all the sheets 19, 21, 22 of the block 18 comprises at least one battery 23 of parallel horizontal tubes 24 at appropriate intervals and fixed at one end to a vertical support plate 30. In the example shown in FIGS. 3 and 4 the machine has two batteries 23 movable horizontally, as shown by the double-headed arrows, by an appropriate device known in itself, not shown. The cellular block 18 resting on a horizontal plane between the two batteries 23, the tubes 24 of the latter can be introduced laterally into the corresponding horizontal cells 27, 28, as shown in FIG. 4. The tubes 24 are each provided with nozzles 29 for blowing hot air and then cold air, in the example shown two such nozzles 29 separated by a distance equal to the distance e between two consecutive contact lands 25 or 26. With this minimal length of the tubes 24 penetrating to the interior of the horizontal cells 27, 28 there therefore remains between the tubes 24 of the two batteries 23, in the central area of the block 18, a number of lands 25, 26 which do not receive any hot air.

When the block 18 is placed in the welding unit, pressure P is applied to the lands 25 of the top sheet 19, for example by means of cylinders, not shown, and this pressure is transmitted to all of the lands 25, 26 to be welded. This method has the advantage of obtaining the required welding conditions (temperature and contact pressure) at all the lands to be welded at the same time. The welding time is therefore significantly shorter than in the case of welding executed sheet by sheet in one variant of the invention to produce the cellular block 18. In this latter technique, two sheets are first welded together, after which the subsequent sheets are welded to them one by one in order to construct the cellular block 18.

Also, welding is carried out only when the block 18 has been formed, with the result that the sheets 19, 21, etc are not moved when they are in the machine. This assures accurate positioning of the sheets 19, etc relative to each other.

To give one non-limiting numerical example, the time for blowing hot air through the nozzles 29 can be a few tens of seconds at a temperature of 120° C. and the time for blowing cold air can be a few tens of seconds at room temperature.

If a single battery 23 were used, welding would have to be carried out in two stages on the two opposite sides in succession.

What is claimed is:

1. A machine for welding a block of thermoformed sheets stacked via mutual contact lands, wherein the thermoformed sheets define cells between them, comprising; at least one moveable battery of tubes adapted to be inserted laterally into the cells and said tubes being provided with nozzles for blowing hot air and then cold air onto the contact lands between the thermoformed sheets of the block, and means for applying a pressure (P) to the contact lands of the block urging them together.

2. A machine according to claim 1 characterized in that each tube has two air blowing nozzles separated by a distance equal to the distance (e) between two consecutive contact lands of a thermoformed sheet.

3. A machine according to claim 1 including two batteries of tubes movable to be inserted laterally into the cells on opposite sides of the block, a length of said tubes inside the block being at least equal to the distance (e) between two consecutive contact lands between the thermoformed sheets.

4. A method of welding thermoformed sheets of plastic material to one another wherein the thermoformed sheets include spaced lands, the method comprising; stacking a plurality of thermoformed sheets to form a cellular block defined by sets of cells separated by contacting opposing lands of the thermoformed sheets, welding the thermoformed sheets two by two while applying a transverse pressure to the thermoformed sheets to press them together at the lands, the step of welding including providing at least one battery of tubes equipped with nozzles, introducing the at least one battery of tubes laterally into the cells from at least one side of the cellular block and blowing hot air and then cold air from the nozzles within the cells to weld the lands of the contacting thermoformed sheets together.

5. The method of claim 4 in which the nozzles of the tubes are aligned with contacting lands of the thermoformed sheets being welded and the hot air and then the cold air are blown to weld the lands of contacting thermoformed sheets from opposite sides of the contacting lands being welded.

6. A method of welding thermoformed sheets together wherein the thermoformed sheets include a plurality of lands, the method comprising the steps of stacking the thermoformed sheets to form a cellular block defined by sets of cells separated by contacting opposing lands of the thermoformed sheets and thereafter introducing batteries of tubes laterally into the cells from opposite sides of the cellular block each equipped with nozzles and blowing hot air and then cold air two from the nozzles into the cells for purposes of welding the lands of contacting thermoformed sheets together while applying pressure to the stack of thermoformed sheets to press them together at opposing lands.

7. The method of claim 6 wherein only contacting opposing lands adjacent a periphery of the cellular block are welded to one another.

* * * * *

UNITED STATES PATENT AND TRADEMARK OFFICE
CERTIFICATE OF CORRECTION

PATENT NO. : 6,217,699 B1
DATED : April 17, 2001
INVENTOR(S) : Claude Martin

It is certified that error appears in the above-identified patent and that said Letters Patent is hereby corrected as shown below:

<u>Title page,</u>
-- Item [73] Assignee: Hamon Thermal Europe (France), Paris (FR) --

Signed and Sealed this

Second Day of April, 2002

JAMES E. ROGAN
*Director of the United States Patent and Trademark Office*

*Attest:*

*Attesting Officer*